(12) United States Patent
Maruyama et al.

(10) Patent No.: US 11,858,194 B2
(45) Date of Patent: Jan. 2, 2024

(54) CONTAINER MOLD AND METHOD OF MANUFACTURING A CONTAINER

(71) Applicant: NISSEI ASB MACHINE CO., LTD., Nagano (JP)

(72) Inventors: Yasuhide Maruyama, Nagano (JP); Tadahiko Yanagisawa, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 143 days.

(21) Appl. No.: 17/434,282

(22) PCT Filed: Feb. 27, 2020

(86) PCT No.: PCT/JP2020/007959
§ 371 (c)(1),
(2) Date: Aug. 26, 2021

(87) PCT Pub. No.: WO2020/175607
PCT Pub. Date: Sep. 3, 2020

(65) Prior Publication Data
US 2022/0134630 A1 May 5, 2022

(30) Foreign Application Priority Data

Feb. 28, 2019 (JP) ................................. 2019-035927

(51) Int. Cl.
*B29C 49/48* (2006.01)
*B29B 11/08* (2006.01)
(Continued)

(52) U.S. Cl.
CPC .............. *B29C 49/48* (2013.01); *B29B 11/08* (2013.01); *B29C 49/06* (2013.01); *B29C 49/12* (2013.01);
(Continued)

(58) Field of Classification Search
CPC .......... B29C 49/482; B29C 2049/4892; B29C 49/427
See application file for complete search history.

(56) References Cited

U.S. PATENT DOCUMENTS

| 4,529,570 | A | 7/1985 | Przytulla |
| 9,254,604 | B2 | 2/2016 | Lisch et al. |

(Continued)

FOREIGN PATENT DOCUMENTS

| CN | 102069582 A | 5/2011 |
| CN | 102092130 A | 6/2011 |

(Continued)

OTHER PUBLICATIONS

Mechanical translation of Kuroda (JP H09-290456 A) dated Nov. 1997. (Year: 1997).*

(Continued)

*Primary Examiner* — Robert B Davis
(74) *Attorney, Agent, or Firm* — Greenblum & Bernstein, P.L.C.

(57) ABSTRACT

A container mold includes: a split mold that has a mold space defining a shape of a body portion of a container; and a bottom mold that has a bottom mold surface defining a shape of a bottom surface of the container and is movable forward and backward with respect to the split mold. The split mold includes a bottom mold reception portion that is communicated with a bottom portion side of the mold space and receives the bottom mold. When the bottom mold is closed with respect to the split mold, a space between a surface of the bottom mold reception portion facing the bottom mold surface and the bottom mold surface is a space that defines a shape of a structure protruding in a radial direction of the container.

12 Claims, 13 Drawing Sheets

(51) Int. Cl.
    *B29C 49/06*    (2006.01)
    *B29C 49/12*    (2006.01)
    *B29C 49/46*    (2006.01)
    *B29C 49/68*    (2006.01)
    *B29C 49/78*    (2006.01)

(52) U.S. Cl.
    CPC .............. *B29C 49/46* (2013.01); *B29C 49/68* (2013.01); *B29C 49/78* (2013.01)

(56) References Cited

U.S. PATENT DOCUMENTS

| | | | |
|---|---|---|---|
| 2016/0288398 A1* | 10/2016 | Derrien | B65D 1/023 |
| 2017/0021550 A1 | 1/2017 | Derrien et al. | |

FOREIGN PATENT DOCUMENTS

| | | | |
|---|---|---|---|
| JP | 49-126765 A | 12/1974 | |
| JP | 4-174668 A | 6/1992 | |
| JP | 5-237923 A | 9/1993 | |
| JP | 7-205997 A | 8/1995 | |
| JP | 8-244749 | 9/1996 | |
| JP | 9-290456 A | 11/1997 | |
| JP | 2002-355885 A | 12/2002 | |
| JP | 2005-169698 A | 6/2005 | |
| JP | 2016-37313 A | 3/2016 | |
| JP | 2017-512686 A | 5/2017 | |
| WO | WO-2017090774 A1 * | 6/2017 | ............ B29B 11/08 |

OTHER PUBLICATIONS

Mechanical translation of Kawamura et al (WO 2017/090774 A1) dated Jun. 2017. (Year: 2017).*

Office Action issued in Chinese Patent Application No. 202080016993.5 dated Nov. 1, 2022, along with English summary translation thereof.

International Search Report issued in International Patent Application No. PCT/JP2020/007959, dated Apr. 28, 2020, along with English translation thereof.

Written Opinion of the International Searching Authority issued in International Patent Application No. PCT/JP2020/007959, dated Apr. 28, 2020, along with English translation thereof.

* cited by examiner

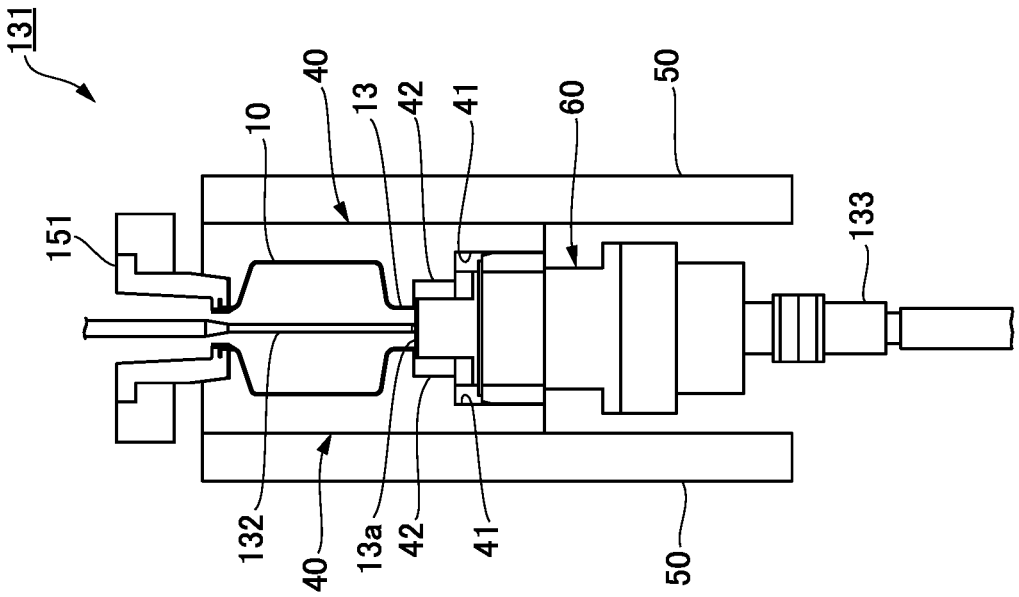
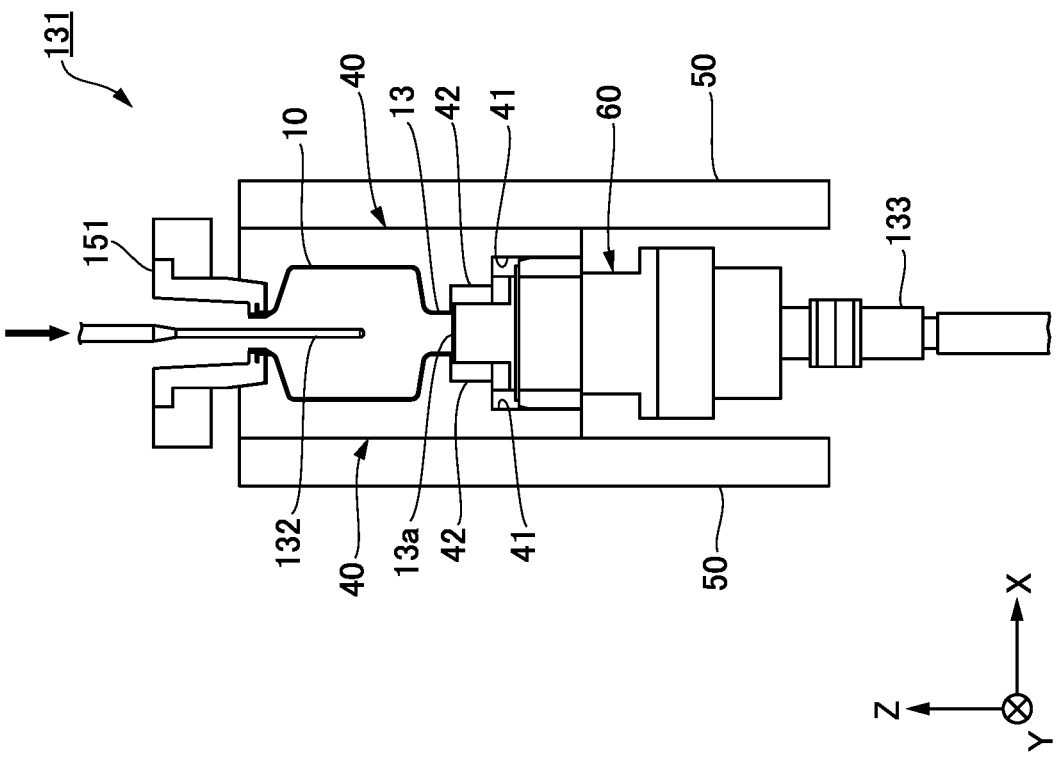

CONTAINER MOLD AND METHOD OF MANUFACTURING A CONTAINER

BACKGROUND OF THE INVENTION

Field of the Invention

The present invention relates to a container mold and a method of manufacturing a container.

Description of the Related Art

Conventionally, various containers in which a structure such as a hanging tool or a leg is formed on the bottom portion of the container have been proposed (see, for example, JP 2002-355885 A, JP 2005-169698 A, JP 2016-37313 A, JP 2017-512686 A, JP H8-244749 A and U.S. Pat. No. 9,254,604). As a method for manufacturing this type of container, for example, an extrusion blow molding method or a stretch blow molding method can be used.

A container manufactured by the extrusion blow molding method is generally inferior to a container manufactured by the stretch blow molding method in terms of aesthetic appearance, dimensional accuracy, and the like. In addition, according to the extrusion blow molding method, a post-process such as cutting off of a burr remaining on the container after blow-molding and trimming of the cut surface is required, and the amount of resin to be discarded is large. Under such a background, there is an increasing demand for manufacturing even a container having a shape that is relatively difficult to process by the stretch blow molding method.

It is relatively difficult to form, for example, a solid structure protruding in a radial direction on the bottom surface side of the container by applying the stretch blow molding method, and further contrivance is desired.

SUMMARY OF THE INVENTION

A container mold according to an aspect of the present invention includes: a split mold that has a mold space defining a shape of a body portion of a container; and a bottom mold that has a bottom mold surface defining a shape of a bottom surface of the container and is movable forward and backward with respect to the split mold. The split mold includes a bottom mold reception portion that is communicated with a bottom portion side of the mold space and receives the bottom mold. When the bottom mold is closed with respect to the split mold, a space between a surface of the bottom mold reception portion facing the bottom mold surface and the bottom mold surface is a space that defines a shape of a structure protruding in a radial direction of the container.

A container manufacturing method according to an aspect of the present invention uses a container mold according to an aspect and includes: disposing, in the mold space of the split mold, a preform having a bottomed shape and made of heated resin; stretching the preform with a stretching rod; introducing a pressurized fluid into the preform and blow-molding a container to expand to the bottom mold reception portion; and closing the bottom mold and compressing a portion of the expanded container with the bottom mold reception portion and the bottom mold surface to form the structure on the container.

Further features of the present invention will become apparent from the following description of exemplary embodiments with reference to the attached drawings.

BRIEF DESCRIPTION OF THE DRAWINGS

FIGS. 13A and 13B is a diagram illustrating an operation example in a blow molding unit according to the second embodiment.

DESCRIPTION OF THE EMBODIMENTS

Figures 1A, 1B, 1C:
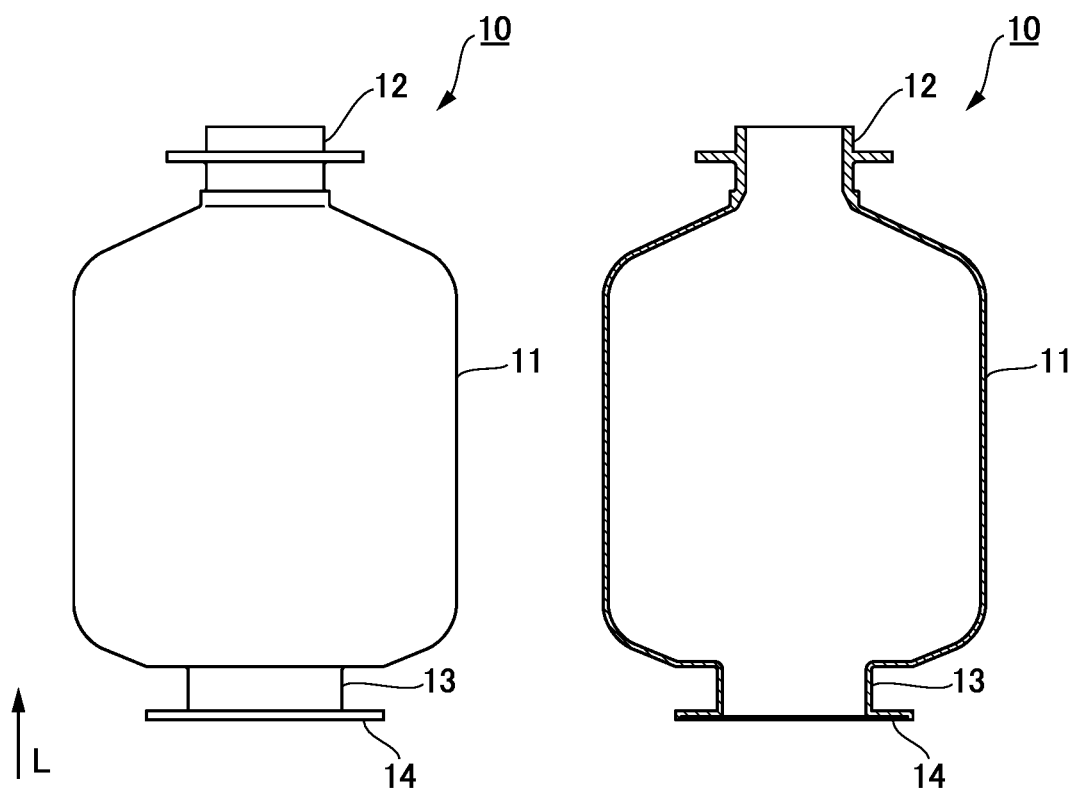
FIG. 1A is a front view of a container.
FIG. 1B is a bottom view of the container.
FIG. 1C is a cross-sectional view of the container taken along line Ic-Ic.

Embodiments of the present invention will be described below with reference to the drawings.

In the embodiments, for the sake of easy understanding, structures and elements other than the main part of the present invention will be described in a simplified manner or omitted. In addition, in the drawings, the same elements are denoted by the same reference numerals. Note that, in the drawings, the thickness, shape, and the like of a container and a preform are schematically illustrated, and do not indicate actual thickness, shape, and the like.

First Embodiment

<Configuration Example of the Container>

First, a configuration example of a container 10 made of resin according to the present embodiment will be described with reference to FIGS. 1A to 1C.

FIG. 1A is a front view of the container 10, FIG. 1B is a bottom view of the container 10, and FIG. 1C is a cross-sectional view of the container taken along line Ic-Ic. In FIGS. 1A to 1C, an axial direction L of the container is indicated by an arrow.

The container 10 is a container used for, for example, infusion of a drug, and is manufactured from a preform 20 having a bottomed cylindrical shape described later by the stretch blow molding method.

The container 10 includes a body portion 11 formed in a substantially rectangular shape in a front view, a neck portion 12 which is formed at the center on an upper side of the body portion 11 and serves as an entrance and exit of the container 10, and a bottom cylindrical portion 13 which is formed at the center on a lower side of the body portion 11 and has a closed bottom surface side. A flange 14 having an annular shape, which is an example of a structure protruding outward in the radial direction of the bottom cylindrical portion 13, is formed on the bottom surface of the bottom cylindrical portion 13. Note that an opening for infusion or the like may be formed in a bottom surface portion 13*a* of the bottom cylindrical portion 13 in a later process.

The material of the container 10 is a thermoplastic synthetic resin, and can be appropriately selected according to the application of the container 10. Specific examples of types of the material include polyethylene terephthalate (PET), polyethylene naphthalate (PEN), polycyclohexanedimethylene terephthalate (PCTA), Tritan ((registered trademark): co-polyester manufactured by Eastman Chemical Company), polypropylene (PP), polyethylene (PE), polycarbonate (PC), polyethersulfone (PES), polyphenylsulfone (PPSU), polystyrene (PS), cyclic olefin polymer (COP/COC), polymethyl methacrylate: acrylic (PMMA), polylactic acid (PLA), and the like.

<Description of the Blow Molding Apparatus>

Figure 2:
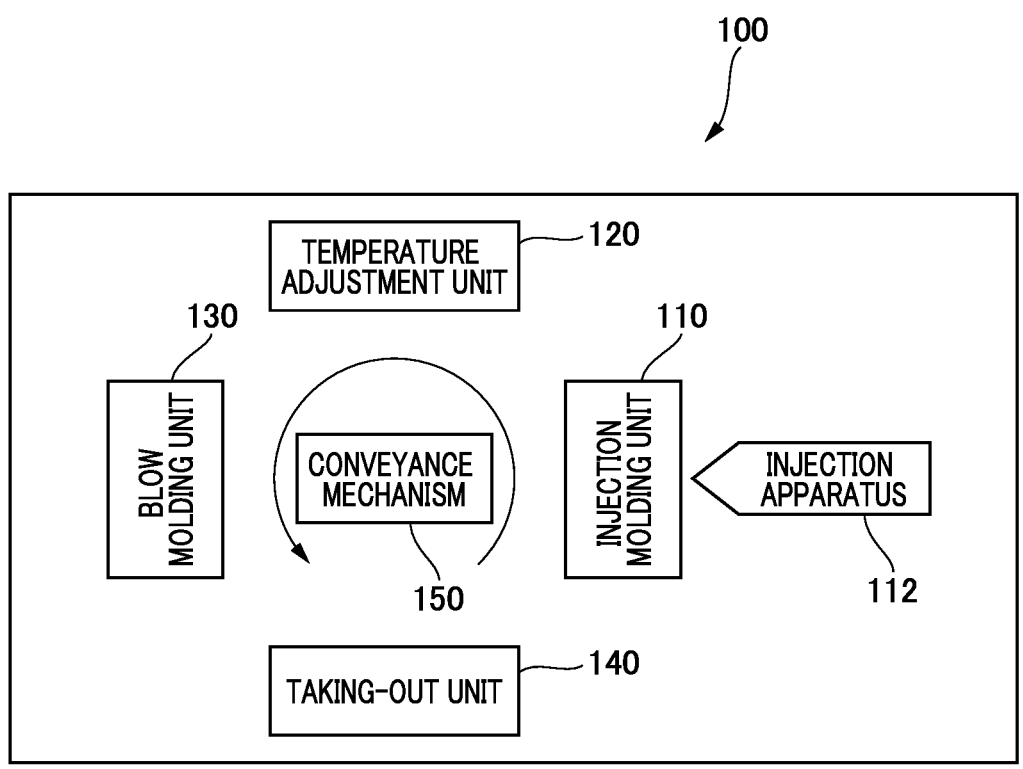
FIG. 2 is a block diagram schematically illustrating a configuration of a blow molding apparatus.

Next, a blow molding apparatus 100 for manufacturing the container 10 will be described with reference to FIG. 2. FIG. 2 is a block diagram schematically illustrating a configuration of the blow molding apparatus 100. The blow molding apparatus 100 according to the present embodiment is a hot parison type (also referred to as a one-stage type) apparatus that performs blow molding by utilizing residual heat (internal heat quantity) during injection molding without cooling the preform 20 to room temperature.

The blow molding apparatus 100 includes an injection molding unit 110, a temperature adjustment unit 120, a blow molding unit 130, a taking-out unit 140, and a conveyance mechanism 150. The injection molding unit 110, the temperature adjustment unit 120, the blow molding unit 130, and the taking-out unit 140 are disposed at positions rotated by a predetermined angle (for example, 90 degrees) about the conveyance mechanism 150.

The conveyance mechanism 150 includes a rotary plate (not illustrated) that rotates about an axis in a direction perpendicular to the sheet of paper of FIG. 2 (Z direction). On the rotary plate, one or more neck molds 151 (not illustrated in FIG. 2) for holding the neck portion of the preform 20 or the container 10 are disposed at each predetermined angle. The conveyance mechanism 150 rotates the rotary plate to convey the preform 20 (or the container 10) having the neck portion held by the neck mold 151 to the injection molding unit 110, the temperature adjustment unit 120, the blow molding unit 130, and the taking-out unit 140 in this order.

The injection molding unit 110 includes an injection cavity mold and an injection core mold, which are both not illustrated, and manufactures the preform 20. An injection apparatus 112 that supplies a resin material, which is a raw material of the preform, is connected to the injection molding unit 110.

In the injection molding unit 110, the injection cavity mold, the injection core mold, and the neck mold 151 of the conveyance mechanism 150 are closed to form a preform-shaped mold space. Then, by pouring the resin material from the injection apparatus 112 into the preform-shaped mold space, the preform 20 is manufactured by the injection molding unit 110.

Note that even when the injection molding unit 110 is opened, the neck mold 151 of the conveyance mechanism 150 is not opened, and the preform 20 is held and conveyed. The number of preforms 20 simultaneously molded by the injection molding unit 110 (i.e., the number of containers 10 that can be simultaneously molded by the blow molding apparatus 100) can be appropriately set.

The temperature adjustment unit 120 includes a temperature adjustment mold (heating pot or temperature adjustment pot) 121 capable of accommodating the preform 20. The temperature adjustment unit 120 accommodates the preform 20 in the temperature adjustment mold 121, and adjusts the temperature of a stretched portion (body portion or bottom portion) of the preform 20 manufactured by the injection molding unit 110 to a temperature suitable for final blowing (for example, about 90 to 100° C. for PET and about 130 to 140° C. (around about 135° C.) for PP).

Figure 3B:
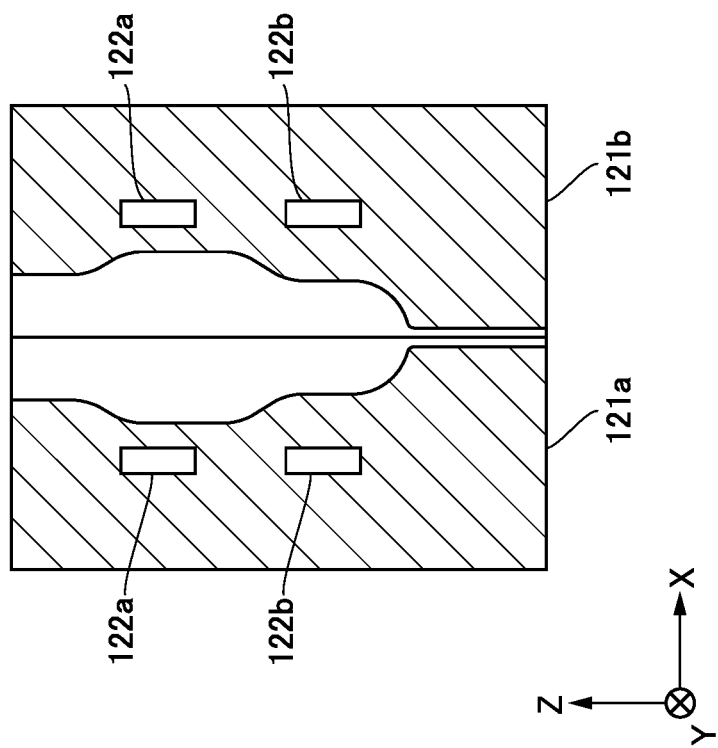
FIGS. 3A and 3B are diagrams schematically illustrating a configuration example of a temperature adjustment mold.
Figure 3A:
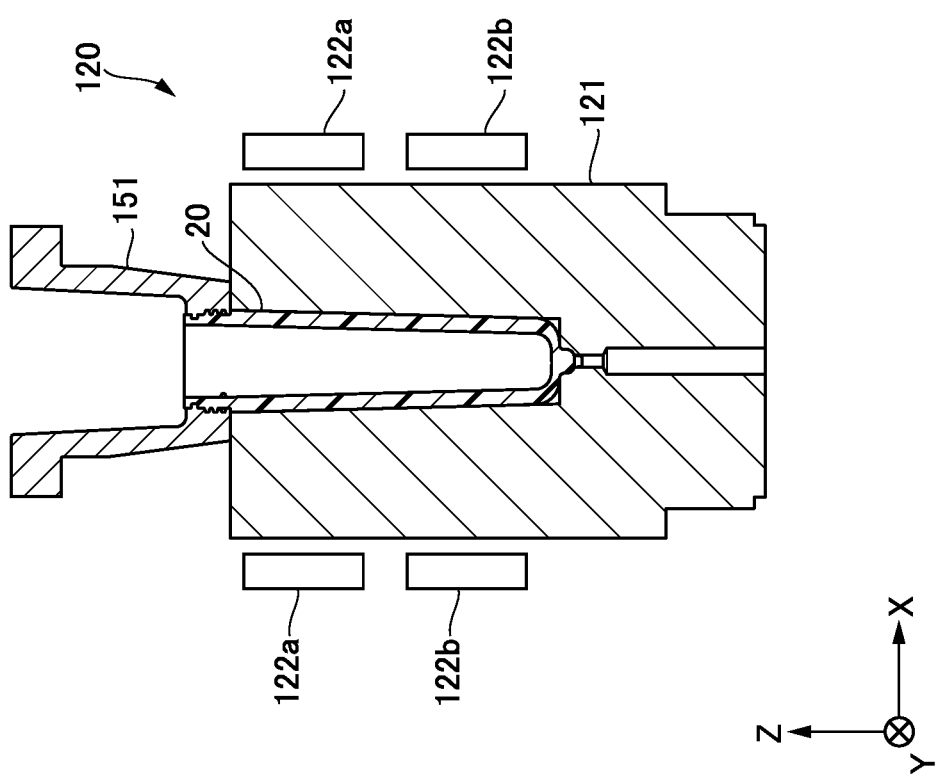

FIG. 3A is a diagram schematically illustrating a configuration example of the temperature adjustment mold 121.

The temperature adjustment mold 121 has a space for accommodating a portion (body portion and bottom portion) below the neck portion of the preform 20. A plurality of heaters 122*a* and 122*b* for externally heating the preform 20 in the axial direction of the preform 20 is disposed with respect to the temperature adjustment mold 121.

Therefore, the temperature of the preform 20 can be changed in the axial direction by changing the temperature of each of the heaters 122*a* and 122*b*. In the present embodiment, the temperature of the heater 122*a* on the neck portion side is set to be higher than the temperature of the heater 122*b* on the bottom portion side. Note that a heating rod (not illustrated) may be inserted into the hollow portion inside the preform 20 in a non-contact manner to simultaneously adjust the temperature (heat or cool) inside and outside the preform 20.

Here, the temperature adjustment mold 121 may have a structure in which a temperature adjustment circuit (heater (temperature adjustment medium flow circuit)) that circulates a temperature adjustment medium having a predetermined temperature (for example, 40 to 80° C.) is incorporated. More preferably, as illustrated in FIG. 3B, it is desirable that the temperature adjustment mold includes a pair of split molds (121*a* and 121*b*) incorporating temperature adjustment circuits (heaters (temperature adjustment medium flow circuits) 122*a* and 122*b*), and has a shape in which the diameter is increased only in an upper part of the space for accommodating the preform 20. Furthermore, the depth (length) of the space for accommodating the preform 20 is set to be substantially the same as the length of the preform 20, and is desirably set to, for example, 0.95 to 1.10 times, preferably 1.0±0.02 times the length of the preform 20. The preform 20 is preliminarily blown (stretched by compressed air in the temperature adjustment unit 120) using the temperature adjustment molds 121*a* and 121*b* illustrated in FIG. 3B, so that the preform 20 is brought into contact with the inner surface of the temperature adjustment mold 121 and the temperature is adjusted. At this time, only the upper part of the body portion of the preform 20 is increased in diameter (stretched) to be thin and to be close to the shape of the container 10, while the lower part of the body portion and the bottom portion are hardly increased in diameter and substantially the same thickness as the injection molding unit 110 is maintained. Thus, the container 10 having favorable quality (appearance and thickness distribution (physical properties)) can be manufactured by final blowing (stretching by compressed air and a stretching rod in the blow molding unit 130). That is, by preliminarily blowing the preform 20 in the temperature adjustment mold 121, the distribution status of the temperature, the internal heat quantity, and the thickness of the preform 20 can be suitably adjusted. Specifically, in the preform 20 expanded by the final blowing, it is possible to suitably leave a thickness on the bottom portion side where the flange 14 having an annular shape is formed.

The blow molding unit 130 performs blow molding on the preform 20 whose temperature has been adjusted by the temperature adjustment unit 120 to manufacture the container 10.

The blow molding unit 130 includes a blow molding mold 131 corresponding to the shape of the container 10, a stretching rod 132 for stretching the preform 20, a blow nozzle (not illustrated), and a lifting mechanism 133 for lifting a bottom mold 60 described later.

Figure 4C:
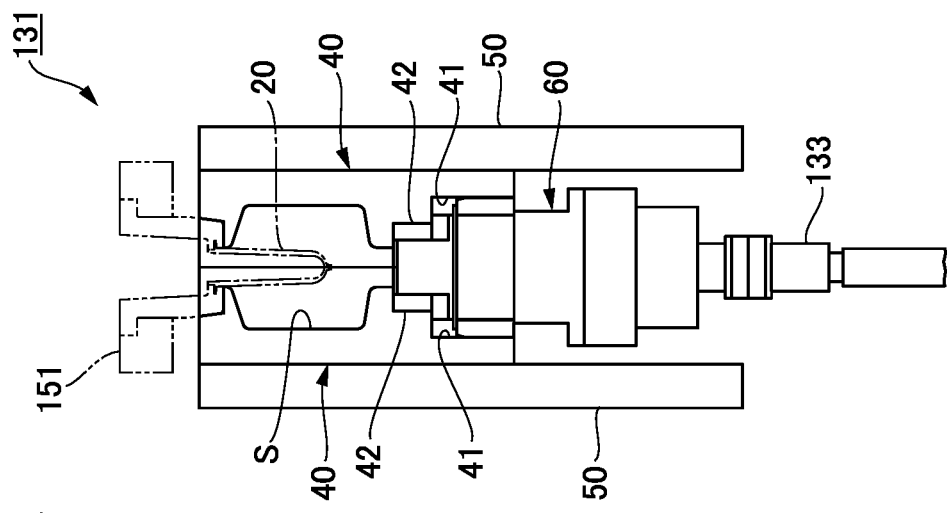
FIG. 4C is a view of the blow cavity split molds and the bottom mold at a mold closing position (after rising of the bottom mold).
Figure 4B:
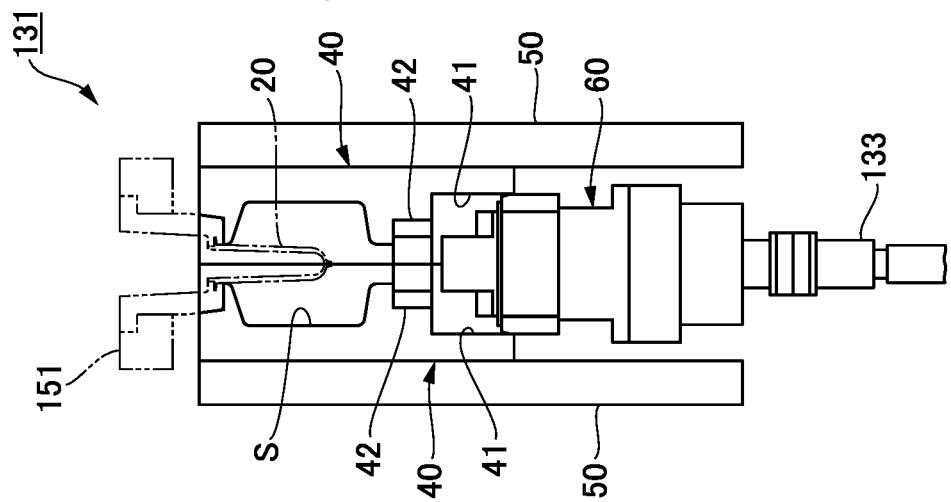
FIG. 4B is a view of the blow cavity split molds at a mold closing position (before rising of the bottom mold)
Figure 4A:
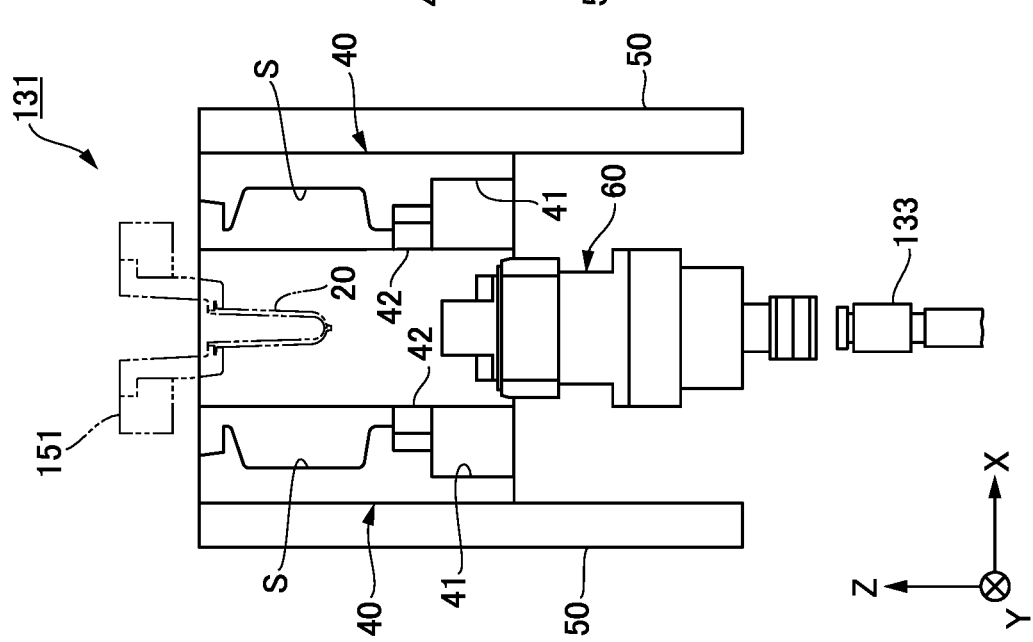
FIG. 4A is a view of blow cavity split molds and a bottom mold at a mold opening position.

A configuration example of the blow molding mold 131 will be described with reference to FIGS. 4A to 4C. FIG. 4A is a view of blow cavity split molds and a bottom mold at a mold opening position, FIG. 4B is a view of the blow cavity split molds at a mold closing position (before rising of the bottom mold), and FIG. 4C is a view of the blow cavity split molds and the bottom mold at a mold closing position (after rising of the bottom mold).

The blow molding mold 131 includes a pair of blow cavity split molds 40 and 40, a pair of accommodation portions (blow cavity fixing plates) 50 and 50, and the bottom mold 60.

The blow cavity split molds 40 and 40 are mold members having a mold space S that defines the shape of the main portion (the body portion 11 and the bottom cylindrical portion 13) of the container 10 excluding the flange 14. The blow cavity split molds 40 and 40 are divided by a parting plane along an up-and-down direction (Z direction) in FIG. 4A, and are configured to be openable and closable in a left-and-right direction (X direction) in FIG. 4A.

Bottom mold reception portions 41 for receiving the bottom mold 60 are formed below the mold space S of the container in the blow cavity split molds 40 and 40. The bottom mold reception portions 41 have a cylindrical space communicating with the bottom portion side of the bottom cylindrical portion 13 of the container 10 in the mold space S and having an inner diameter larger than that of the bottom cylindrical portion 13. A lower side of the bottom mold reception portions 41 is opened so that the bottom mold 60 can be inserted from below the blow cavity split molds 40 and 40.

Figure 5:
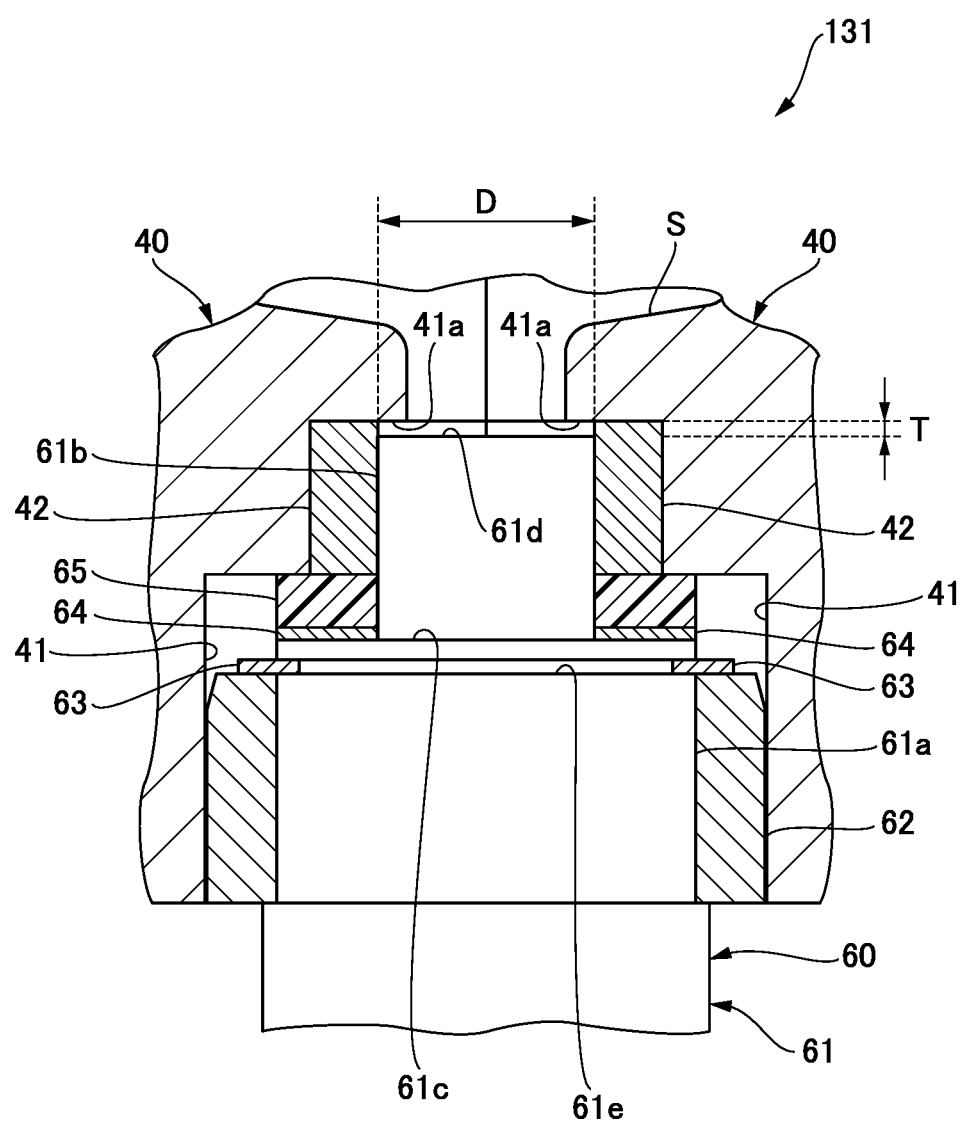
FIG. 5 is an enlarged view illustrating a mold closing state of blow cavity split molds and a bottom mold.

A pair of first spacer members 42 and 42 are exchangeably attached to the blow cavity split molds 40 and 40, respectively, at an upper step portion of the bottom mold reception portions 41 communicating with the mold space S. The pair of first spacer members 42 and 42 have a halved cylindrical shape as illustrated in FIG. 5 described later. The pair of first spacer members 42 and 42 are respectively attached to the blow cavity split molds 40 and 40 using bolts (not illustrated) or the like so that the parting plane matches the parting plane of the blow cavity split molds 40 and 40.

The pair of first spacer members 42 and 42 have a cylindrical shape when the mold is closed. The inner peripheral surface of the first spacer members 42 and 42 defines the protrusion amount of the flange 14 of the container 10 (diameter dimension width D of the flange illustrated in FIG. 5) and the outer peripheral shape of the flange 14. Note that, in the present embodiment, the flange 14 has a circular shape.

The pair of accommodation portions 50 and 50 are disposed with the blow cavity split molds 40 and 40 interposed therebetween, and accommodate the corresponding blow cavity split molds 40. In addition, the accommodation portions 50 are connected to an opening/closing mechanism (not illustrated) of the blow cavity split molds 40 and 40, and move the blow cavity split molds 40 and 40 in the left-and-right direction (X direction) in FIG. 4A.

In addition, the accommodation portions 50 of FIG. 4A include a space that allows lifting of the bottom mold 60.

The bottom mold 60 is a mold member that is disposed below the blow cavity split molds 40 and 40 and defines the shape of the bottom surface of the container 10. As illustrated in FIGS. 4B and 4C, the bottom mold 60 is coupled to the lifting mechanism 133 of the blow molding apparatus 100, and can move forward and backward by lifting with respect to the blow cavity split molds 40 and 40 which are closed.

Figure 6:
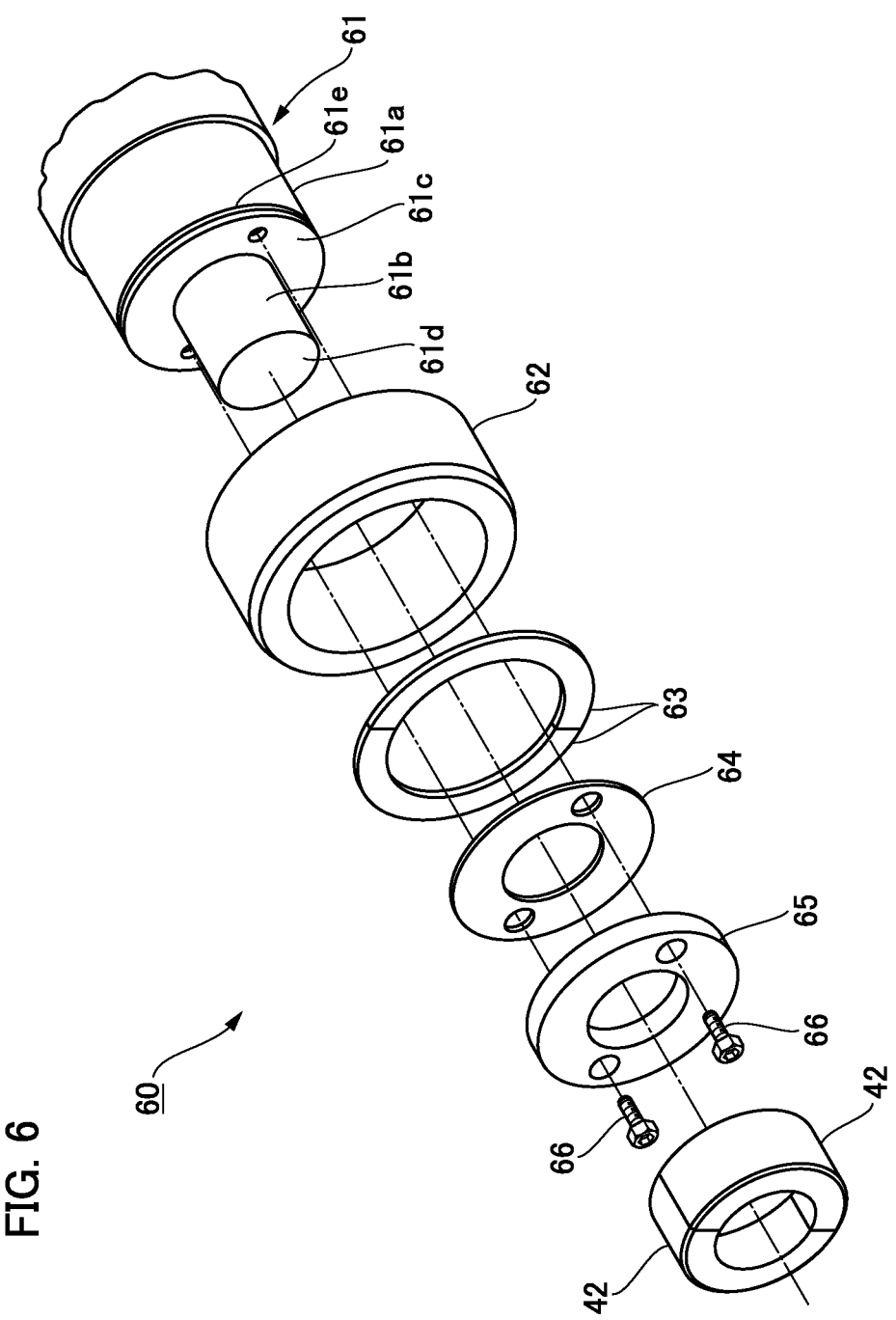
FIG. 6 is an exploded perspective view illustrating a configuration example of first spacer members and a bottom mold.

FIG. 5 is an enlarged view illustrating a mold closing state of the blow cavity split molds 40 and 40 and the bottom mold 60. FIG. 6 is an exploded perspective view illustrating a configuration example of the first spacer members 42 and 42 and the bottom mold 60.

The bottom mold 60 includes a bottom mold main body 61, a positioning ring member 62, pressing members 63 having a split ring shape, a second spacer member 64, and a stopper member 65.

The bottom mold main body 61 is a member that has a coupling portion with the lifting mechanism 133 and receives a force from the lifting mechanism 133 with the bottom mold 60 being in an assembled state. The bottom mold main body 61 has a stepped cylindrical shape whose outer diameter gradually increases from one end side toward the other end side, and includes a large diameter portion 61a and a small diameter portion 61b. In the bottom mold main body 61, a plurality of bolt holes is opened in a step surface 61c that connects the large diameter portion 61a and the small diameter portion 61b and forms a circumferential shape. A groove 61e that receives the pressing members 63 is formed in an annular shape along the circumferential direction on the outer periphery of the large diameter portion 61a.

In addition, the diameter dimension of the small diameter portion 61b is set to a dimension corresponding to the inner diameter of the first spacer members 42 and 42, and the small diameter portion 61b of the bottom mold main body 61 can be inserted inside the first spacer members 42 and 42. The end of the small diameter portion 61b of the bottom mold main body 61 forms a bottom mold surface 61d facing the mold space S and upper surfaces 41a of the bottom mold reception portions 41. In the present embodiment, the bottom mold surface 61d has a flat shape.

In a state where the bottom mold 60 is raised, the preform 20 is compressed between the upper surfaces 41a of the bottom mold reception portions 41 and the bottom mold surface 61d of the bottom mold main body 61, whereby the flange 14 of the container 10 is molded.

The positioning ring member 62 is a member for positioning the bottom mold 60 with respect to the blow cavity split molds 40 and 40 which are closed. The outer diameter of the positioning ring member 62 is set to a dimension corresponding to the inner diameter of the bottom mold reception portions 41, and the outer peripheral surface of the positioning ring member 62 is configured to come into contact with the inner peripheral surface of the bottom mold reception portions 41 when the bottom mold 60 is lifted.

In addition, the inner diameter of the positioning ring member 62 is set to a dimension corresponding to the outer diameter of the large diameter portion 61a of the bottom mold main body 61, and the thickness of the positioning ring member 62 is set to a dimension corresponding to the height of the large diameter portion 61a of the bottom mold main body 61. Therefore, a lower end of the positioning ring member 62 is supported by the outer periphery of the large diameter portion 61a of the bottom mold main body 61. In addition, an upper end of the positioning ring member 62 is pressed by the pressing members 63 having a split ring shape fitted in the groove 61e formed on the outer periphery of the bottom mold main body 61, and the movement in the up-and-down direction is restricted.

The second spacer member 64 is a ring-shaped member and can be replaced with a member having a different thickness. The inner diameter of the second spacer member 64 is set to a dimension corresponding to the diameter of the small diameter portion 61b of the bottom mold main body 61. In addition, the second spacer member 64 is provided with insertion holes at positions corresponding to the bolt holes of the bottom mold main body 61.

The second spacer member 64 is inserted into the small diameter portion 61b of the bottom mold main body 61 and fixed in a state of being in contact with the step surface 61c of the bottom mold main body 61.

In addition, the second spacer member 64 is used to adjust the position of the bottom mold surface 61d in a state where the bottom mold 60 is raised. By adjusting the thickness of the second spacer member 64, in a state where the bottom mold 60 is raised, the distance between the upper surfaces 41a of the bottom mold reception portions 41 and the bottom mold surface 61d of the bottom mold 60 illustrated in FIG. 5 changes, and the thickness dimension (thickness T illustrated in FIG. 5) of the flange 14 of the container 10 can be adjusted.

The stopper member 65 is a ring-shaped member made of resin. The inner diameter of the stopper member 65 is set to a dimension corresponding to the diameter of the small diameter portion 61b of the bottom mold main body 61. Therefore, the stopper member 65 can be inserted into the small diameter portion 61b of the bottom mold main body 61. In addition, the stopper member 65 is provided with insertion holes at positions corresponding to the bolt holes of the bottom mold main body 61.

As illustrated in FIG. 5, the stopper member 65 is disposed so as to sandwich the second spacer member 64 with respect to the step surface 61c of the bottom mold main body 61. The stopper member 65 comes into contact with the bottom mold reception portions 41 of the blow cavity split molds 40 when the bottom mold 60 is raised, and has a function of preventing damage to the bottom mold 60.

When assembling the bottom mold 60, the positioning ring member 62 is inserted into the large diameter portion 61a of the bottom mold main body 61 and fixed by the pressing members 63 having a split ring shape, and then the second spacer member 64 and the stopper member 65 are attached to the small diameter portion 61b of the bottom mold main body 61. Then, the respective members of the bottom mold 60 are fixed by screwing bolts 66 disposed to pass through the insertion holes into the bolt holes.

Here, the shape of the flange 14 of the container 10 can be changed by changing the shape of the pair of first spacer members 42 and 42 attached to the blow cavity split molds 40 and 40, and the bottom mold main body 61. In addition, the thickness of the flange 14 of the container 10 can be adjusted by changing the second spacer member 64 of the bottom mold 60. Furthermore, by changing the shape of the bottom mold surface 61d of the bottom mold main body 61 in the bottom mold 60, for example, the bottom surface shape of the bottom cylindrical portion 13 of the container 10 can be changed.

Referring back to FIG. 2, the taking-out unit 140 is configured to release the neck portion 12 of the container 10 manufactured by the blow molding unit 130 from the neck mold 151 and take out the container 10 to the outside of the blow molding apparatus 100.

<Description of the Blow Molding Method>

Figure 7:
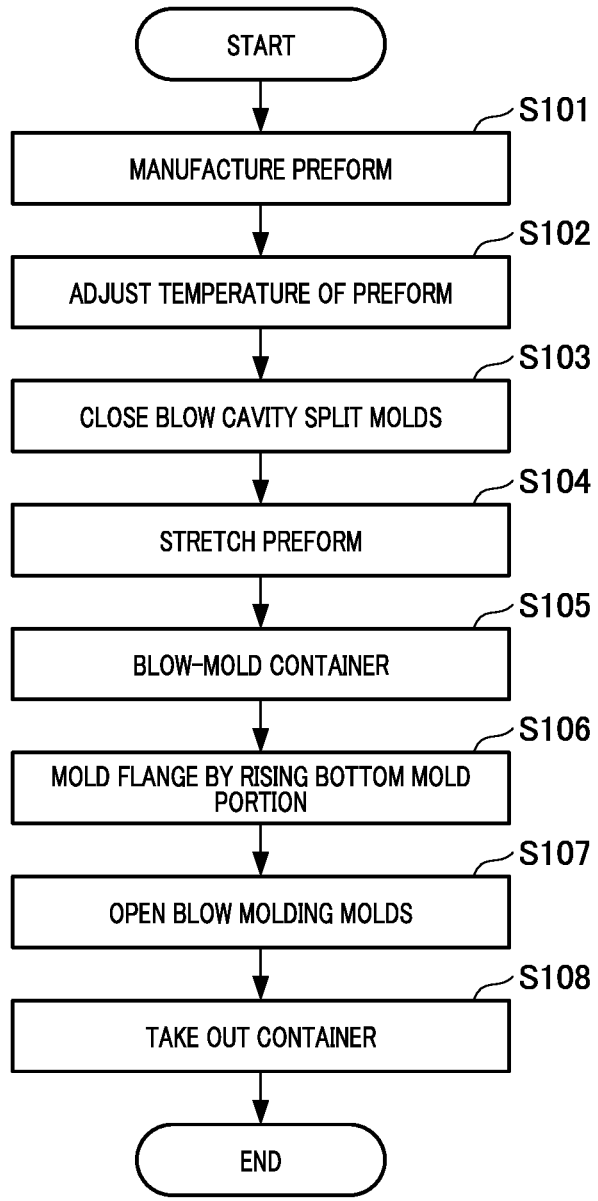
FIG. 7 is a flowchart illustrating processes of a blow molding method.

Next, the blow molding method by the blow molding apparatus 100 of the present embodiment will be described. FIG. 7 is a flowchart illustrating processes of the blow molding method.

First, in the injection molding unit 110, resin is injected from the injection apparatus 112 into a mold space formed by the injection cavity mold, the injection core mold, and the neck mold 151 to manufacture the preform 20 having a bottomed cylindrical shape (step S101).

Subsequently, the rotary plate of the conveyance mechanism 150 rotates a predetermined angle, and the preform 20 in a state containing the residual heat during injection molding is conveyed to the temperature adjustment unit 120. In the temperature adjustment unit 120, temperature adjustment for bringing the temperature of the preform 20 close to a temperature suitable for final blowing is performed (step S102).

Here, in the temperature adjustment mold 121 of the temperature adjustment unit 120, the neck portion side is heated to a higher temperature than the bottom portion side in the body portion of the preform 20 due to the temperature difference between the plurality of heaters 122a and 122b disposed in the axial direction. Therefore, the temperature of the body portion of the preform 20 after the temperature adjustment is higher on the neck portion side than on the bottom portion side.

Subsequently, the rotary plate of the conveyance mechanism 150 rotates a predetermined angle, and the preform 20 whose temperature has been adjusted is conveyed to the blow molding unit 130.

Figure 8:
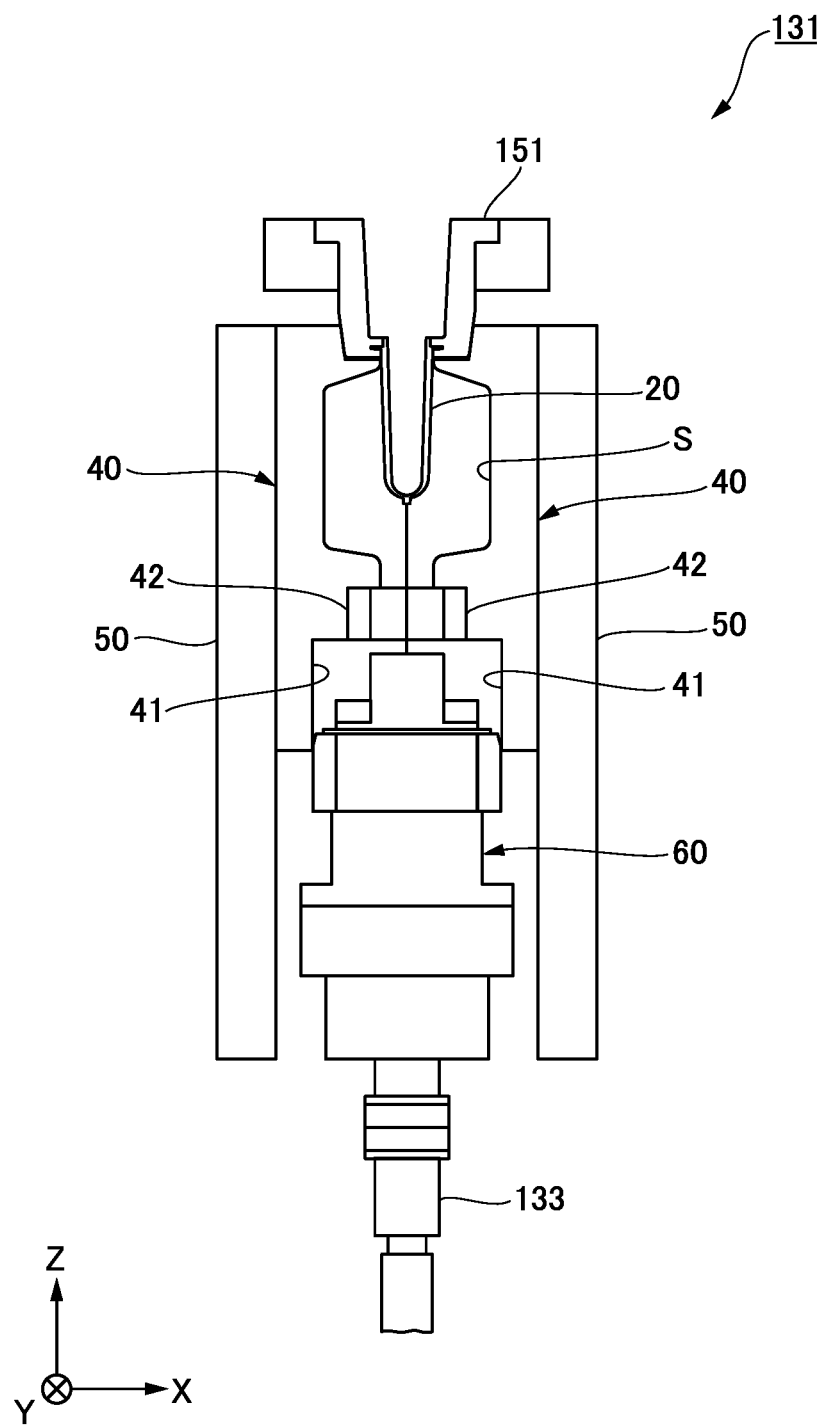
FIG. 8 is a view illustrating processes in a blow molding unit.

When the preform 20 is disposed at a predetermined position in the blow molding unit 130, the blow cavity split molds 40 and 40 are closed as illustrated in FIG. 8 (step S103). In the state illustrated in FIG. 8, the bottom mold 60 is coupled to the lifting mechanism 133, and the position of the bottom mold 60 is at a position retracted downward with respect to the blow cavity split molds 40 and 40.

Figure 9:
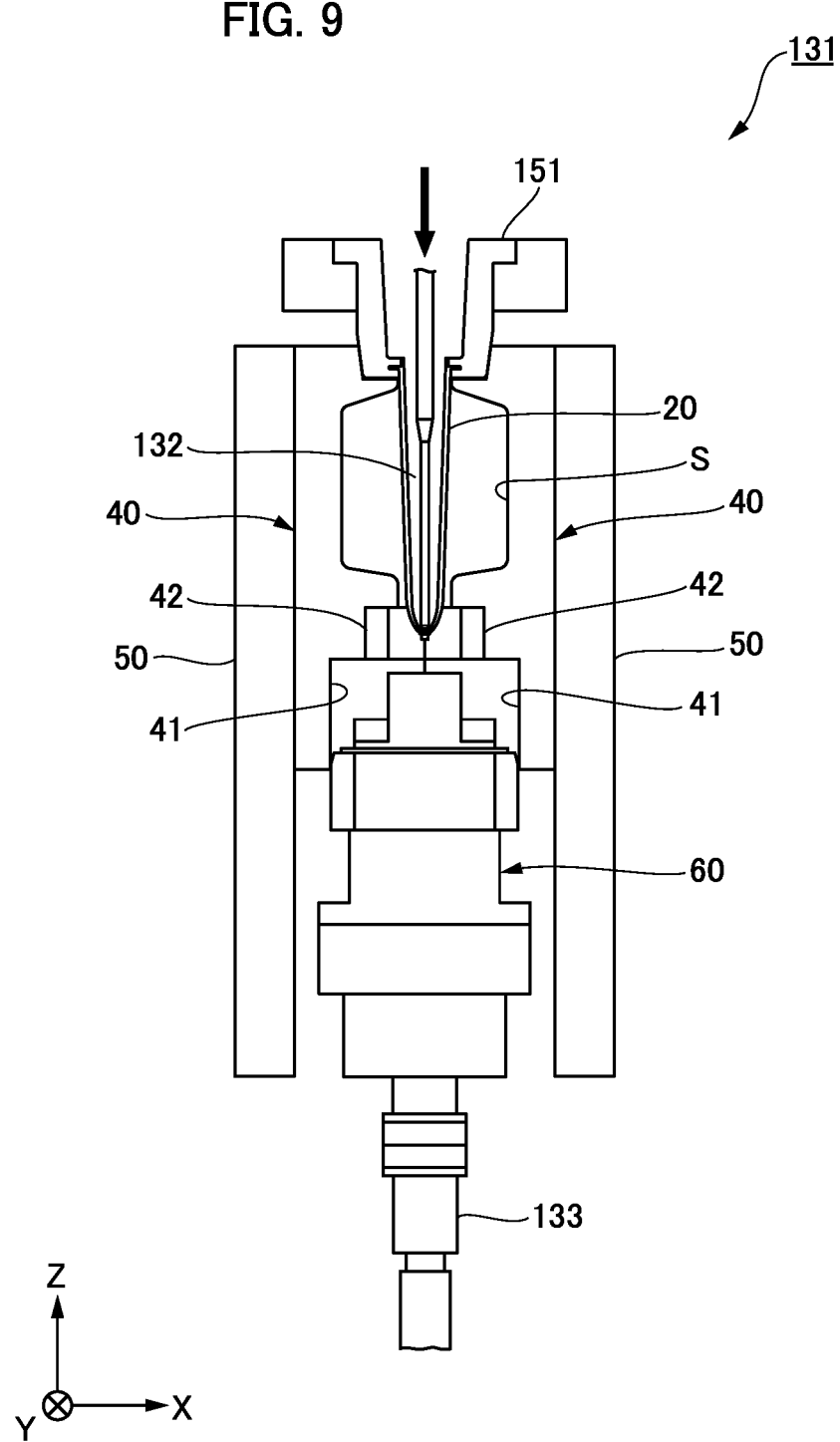
FIG. 9 is a continuation of FIG. 8.

Then, as illustrated in FIG. 9, the stretching rod 132 is inserted into the preform 20, and the preform 20 is slightly stretched only in the vertical direction by lowering the stretching rod 132 (step S104).

Figure 10:
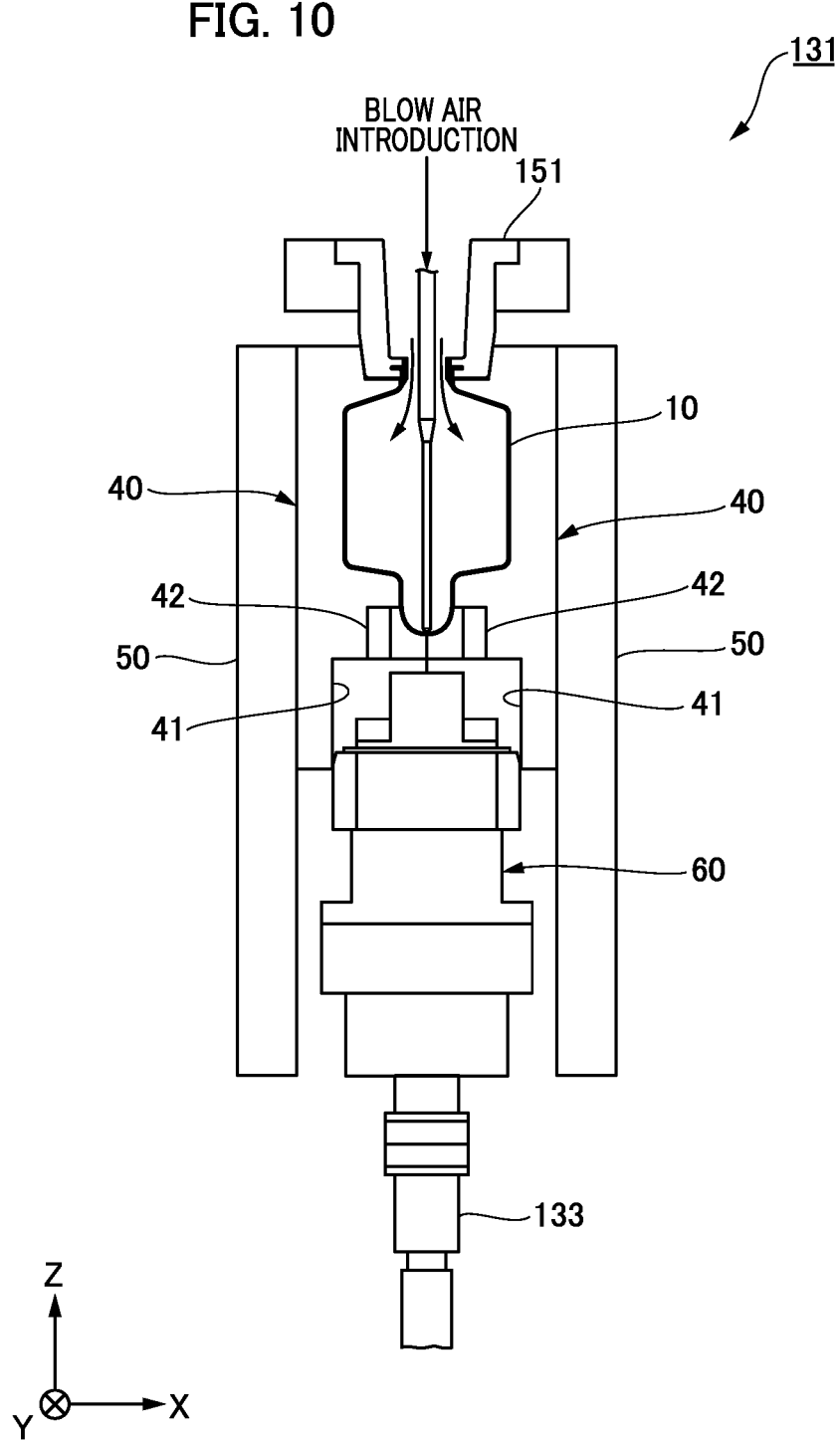
FIG. 10 is a continuation of FIG. 9.

Subsequently, as illustrated in FIG. 10, blow air, which is an example of a pressurized fluid, is introduced into the preform 20 through a blow nozzle. At the same time, the stretching rod 132 is further lowered. Thus, the preform 20 is blow-molded to expand to the bottom mold reception portions 41 into the container 10 (step S105). The temperature of the blow cavity split molds 40 and 40 at this time is preferably set to 60° C. or higher. Note that, in the final blowing molding, the medium for pressurizing the preform 20 is not limited to air, and a gas other than air or a liquid such as water may be used as the pressurizing medium.

Here, in the hot parison type blow molding, the preform 20 is more likely to be deformed as the internal heat quantity (residual heat) of the preform 20 is larger. As described above, the temperature of the body portion of the preform 20 after the temperature adjustment is higher on the neck portion side than on the bottom portion side, and the internal heat quantity is larger on the neck portion side than on the bottom portion side in the body portion of the preform 20. That is, the body portion of the preform 20 is more likely to be deformed on the neck portion side than on the bottom portion side because the internal heat quantity is larger.

Therefore, when the blow air is introduced into the preform 20, in the body portion of the preform 20, the neck portion side having a larger internal heat quantity is stretched earlier, and the bottom portion side having a smaller internal heat quantity is stretched later. Thus, the bottom portion side of the preform 20 is not excessively stretched, and the thickness tends to remain on the bottom surface side of the bottom cylindrical portion 13 of the container 10.

Figure 11:
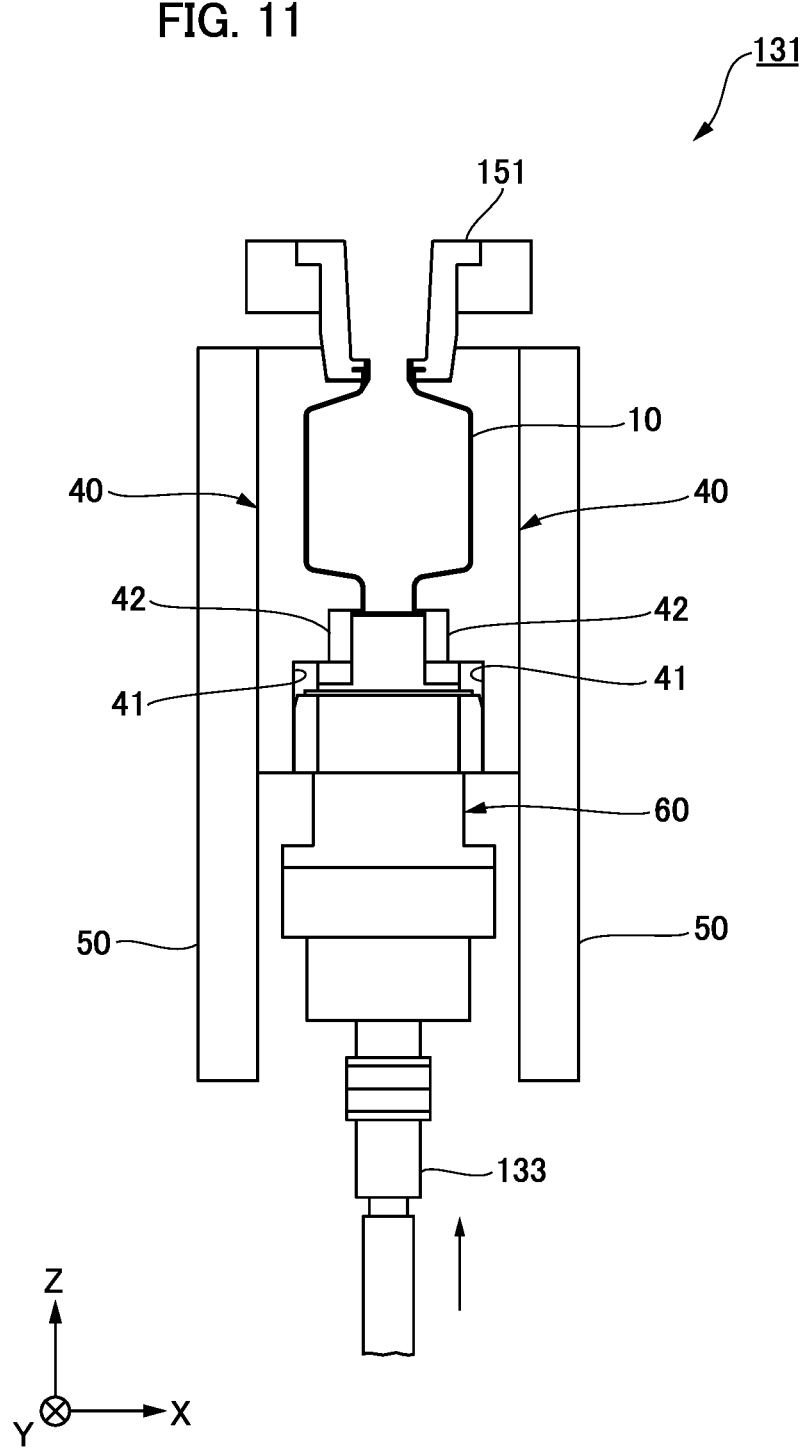
FIG. 11 is a continuation of FIG. 10.

After the stretching rod 132 is raised during the blow molding, the bottom mold 60 moves and rises in the Z direction, and as illustrated in FIG. 11, a portion expanding from the bottom surface side of the bottom cylindrical portion 13 of the container 10 is pressed against the bottom mold 60. The temperature of the bottom mold 60 at this time is preferably set to 60° C. or higher. Note that, for the sake of simplicity, the illustration of the stretching rod 132 is omitted in FIG. 11.

Then, the preform 20 is compressed between the upper surfaces 41a of the bottom mold reception portions 41, the inner peripheral surface of the first spacer members 42 and 42, and the bottom mold surface 61d of the bottom mold main body 61 illustrated in FIG. 5. Thus, the bottom surface of the bottom cylindrical portion 13 of the container 10 is processed to be flat, and the flange 14 is formed on the bottom surface of the bottom cylindrical portion 13 (step S106).

When the molding of the flange 14 of the container 10 is ended, the blow air is exhausted from the container 10 and the stretching rod 132 is pulled out (further raised), and the blow cavity split molds 40 and 40 and the bottom mold 60 are opened (step S107). Thus, the container 10 after blow molding becomes movable.

Subsequently, the rotary plate of the conveyance mechanism 150 rotates a predetermined angle, and the container 10 is conveyed to the taking-out unit 140. In the taking-out unit 140, the neck portion 12 of the container 10 is released from the neck mold 151, and the container 10 is taken out to the outside of the blow molding apparatus 100 (step S108).

Thus, the series of processes of the blow molding method is ended. Then, by rotating the rotary plate of the conveyance mechanism 150 a predetermined angle, the processes of S101 to S108 described above are repeated.

According to the present embodiment, the preform 20 is stretched by the stretching rod 132 to blow-mold the container 10, and then the bottom mold 60 is closed to compress the portion of the container 10 expanding in the bottom mold reception portions 41 with the upper surfaces 41a of the bottom mold reception portions 41 and the bottom mold surface 61d of the bottom mold 60. Thus, the solid structure (flange 14) protruding in the radial direction can be formed on the bottom surface side of the container 10 molded by the stretch blow molding method.

In addition, in the present embodiment, the shape (thickness, width, and shape) of the solid structure formed on the container 10 can be changed by replacing the first spacer members 42 and 42, the bottom mold main body 61, and the second spacer member 64. Therefore, for example, it is possible to easily cope with the case of producing a plurality of types of containers 10 having different structures in small quantities and in large varieties.

Second Embodiment

The second embodiment is a modification of the first embodiment, and an example in which a thin film-shaped portion is formed on the bottom surface portion 13a excluding the flange 14 in the bottom cylindrical portion 13 of the container 10 will be described.

Note that, in the description of the second embodiment, the same elements as those of the first embodiment are denoted by the same reference numerals, and duplicate description is omitted.

The second embodiment is different from the first embodiment in the temperature adjusting process in the temperature adjustment unit 120 and the blow molding process in the blow molding unit 130 as described below.

Figure 12A:
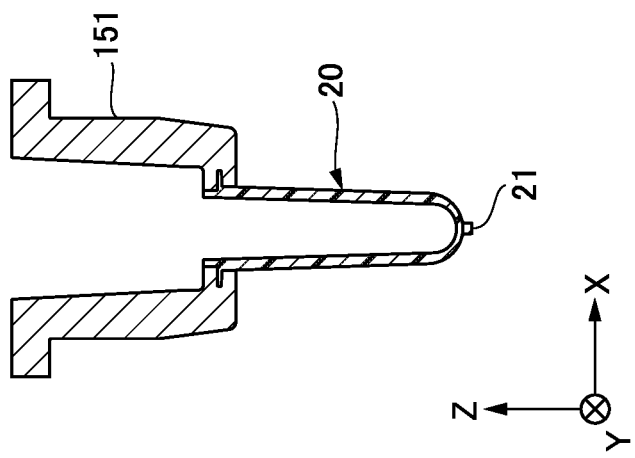
FIGS. 12A, 12B and 12C is a diagram illustrating an operation example in a temperature adjustment unit according to a second embodiment.
Figure 12B:
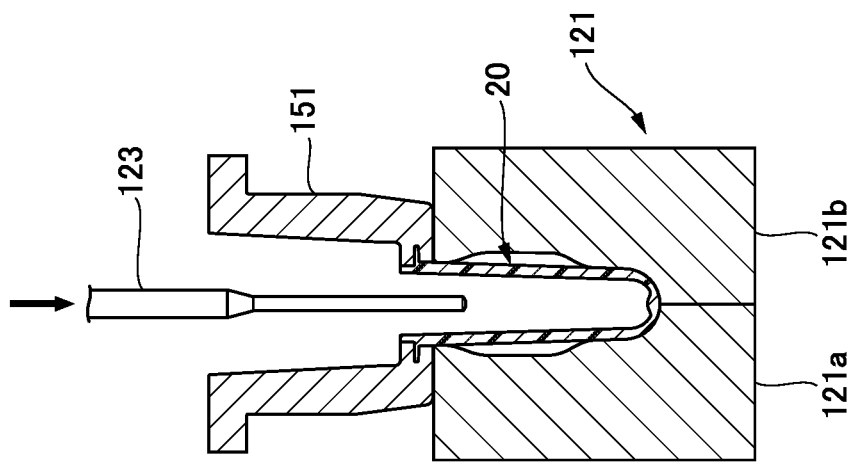
Figure 12C:
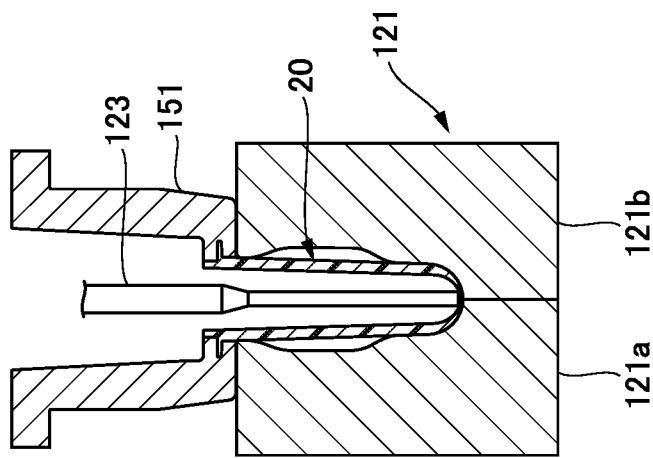

FIGS. 12A to 12C are diagrams illustrating an operation example in the temperature adjustment unit 120 according to the second embodiment.

FIG. 12A illustrates the preform 20 held and conveyed by the neck mold 151. At the bottom portion of the preform 20, a gate portion 21, which is a gate mark of a hot runner during injection molding, is formed so as to protrude to the outside of the preform 20.

FIG. 12B illustrates a state in which the preform 20 is accommodated in the temperature adjustment mold 121. The temperature adjustment mold 121 of the second embodiment is similar to the split molds 121a and 121b illustrated in FIG. 3B. However, the temperature adjustment mold 121 of the second embodiment is different from the example of FIG. 3B in that there is no air clearance hole at the center of the bottom portion facing the gate portion 21 of the preform 20, and the portion at the center of the bottom portion of the temperature adjustment mold 121 is a curved surface following the shape of the bottom portion of the preform 20.

In the second embodiment, when the preform 20 is accommodated in the temperature adjustment mold 121, the gate portion 21 of the preform 20 comes into contact with the curved surface at the center of the bottom portion of the temperature adjustment mold 121. The preform 20 in the temperature adjustment unit 120 has residual heat during injection molding and is in a state of being easily deformed. Therefore, the gate portion 21 in contact with the temperature adjustment mold 121 can be deformed following the curved surface of the bottom portion of the temperature adjustment mold 121. However, also in FIG. 12B, the resin of the gate portion 21 remains at the center of the bottom portion of the preform 20, and is in a relatively thick state.

After the preform 20 is accommodated in the temperature adjustment mold 121, a heating rod 123 is inserted into the preform 20 toward the bottom portion of the preform 20 as illustrated in FIG. 12B. The heating rod 123 is heated with a heater built in at least above its tip portion. As illustrated in FIG. 12C, the heating rod 123 presses the center of the bottom portion of the preform 20 from inside. Then, the preform 20 is sandwiched between the tip portion of the heating rod 123 and the temperature adjustment mold 121, and the resin of the sandwiched portion spreads to the periphery, so that the center of the bottom portion of the preform 20 becomes thin. As described above, in the temperature adjustment unit 120, the thickness of the center of the bottom portion of the preform 20 can be made thinner than the periphery. In addition, it is desirable to preliminarily blow the preform 20 before or after the above-described sandwiching processing to deform the preform 20 into a shape in which the diameter of the upper part of the body portion is increased and the diameter of the lower part of the body portion or the bottom portion is not increased. Furthermore, it is preferable that the temperature of the preliminarily blown preform 20 is simultaneously adjusted inside and outside by the temperature adjustment mold 121 and the heating rod 123 for a predetermined time. Thus, a thickness distribution and a temperature distribution suitable for final blowing can be imparted to the preform 20.

Then, the preform 20 described above is conveyed to the blow molding unit 130.

FIGS. 13A and 13B are diagrams illustrating an operation example in the blow molding unit 130 according to the second embodiment.

The operation of the blow molding unit 130 of the second embodiment is similar to that of the first embodiment up to the processes of S103 to S106 (FIGS. 8 to 11) of FIG. 7.

After the flange 14 is formed on the bottom surface of the bottom cylindrical portion 13 in step S106, the stretching rod 132 lowers toward the bottom mold 60 as illustrated in FIG. 13A. Then, as illustrated in FIG. 13B, the bottom surface portion 13a of the container 10 is sandwiched between the stretching rod 132 and the bottom mold surface 61d of the bottom mold 60 and is pressed and deformed. Thus, a thin film-shaped portion thinner than the periphery is formed at the center of the bottom surface portion 13a of the container 10.

Then, similar to the process of S107 in FIG. 7, the stretching rod 132 is pulled out, and the blow cavity split molds 40 and 40 and the bottom mold 60 are opened. Thus, the container 10 becomes movable from the blow molding unit 130.

In the blow molding unit 130 of the second embodiment, after the flange 14 is formed on the bottom surface side of the container 10, the bottom surface portion 13a of the container 10 is pressed and deformed between the stretching rod 132 and the bottom mold 60 to form a thin film-shaped portion thinner than the periphery on the bottom surface portion 13a. Thus, it becomes easy to form an opening for infusion or the like through the thin film-shaped portion of the bottom surface portion 13a by puncture or the like in subsequent processes, and the usability of the container 10 can be further improved.

In the temperature adjustment unit 120 of the second embodiment, the gate portion 21 of the preform 20 is sandwiched between the heating rod and the temperature adjustment mold 121, and the resin of the gate portion 21 is moved to the periphery to thin the center of the bottom portion of the preform 20 in advance. Thus, processability at the time of forming a thin film-shaped portion on the bottom surface portion 13a of the container 10 is improved, and the yield of the container 10 can be improved.

The present invention is not limited to the above embodiments, and various improvements and design changes may be made without departing from the gist of the present invention.

For example, the container 10 in the above embodiments is merely an example, and the overall shape of the container of the present invention can be variously changed. In addition, the outer peripheral shape of the flange 14 is not limited to a circular shape, and may be, for example, a polygonal shape or a gear shape. In addition, the solid structure formed on the bottom portion side of the container 10 is not limited to the flange, and, for example, a structure having a cylindrical shape, a polygonal prism shape, a conical shape, a polygonal pyramid shape, a truncated cone shape, a polygonal frustum shape, a hemispherical shape, or any shape obtained by combining these shapes can be formed. In addition, the bottom surface shape of the container 10 is not limited to a flat surface, and can be appropriately changed.

Additionally, the embodiments disclosed herein are to be considered in all respects as illustrative and not restrictive. The scope of the present invention is indicated not by the above description but by the claims, and it is intended that meanings equivalent to the claims and all modifications within the scope are included.

The invention claimed is:

1. A container mold comprising:
a split mold that has a mold space defining a shape of a body portion of a container; and
a bottom mold that has a bottom mold surface defining a shape of a bottom surface of the container and is movable forward and backward with respect to the split mold, wherein
the split mold includes a bottom mold reception portion that is communicated with a bottom portion side of the mold space and receives the bottom mold,
when the bottom mold is closed with respect to the split mold, a space between a surface of the bottom mold reception portion facing the bottom mold surface and the bottom mold surface is a space that defines a shape of a structure protruding in a radial direction of the container, and
a first spacer member that defines a radial protrusion amount of the structure or an outer peripheral shape of the structure is exchangeably attached to an inner periphery of the bottom mold reception portion of the split mold.

2. A container mold comprising:
a split mold that has a mold space defining a shape of a body portion of a container; and
a bottom mold that has a bottom mold surface defining a shape of a bottom surface of the container and is movable forward and backward with respect to the split mold, wherein
the split mold includes a bottom mold reception portion that is communicated with a bottom portion side of the mold space and receives the bottom mold,
when the bottom mold is closed with respect to the split mold, a space between a surface of the bottom mold reception portion facing the bottom mold surface and the bottom mold surface is a space that defines a shape of a structure protruding in a radial direction of the container, and
the bottom mold includes an attachment portion of a second spacer member that adjusts a position of the bottom mold surface when the mold is closed and defines a thickness of the structure.

3. A method of manufacturing a container using the container mold according to claim 1, the method comprising:
disposing a preform having a bottomed shape in the mold space of the split mold, the preform is made of resin and heated;
stretching the preform with a stretching rod;
introducing a pressurized fluid into the preform and blow-molding a container to expand to the bottom mold reception portion; and
closing the bottom mold and compressing a portion of the expanded container with the bottom mold reception portion and the bottom mold surface to form the structure on the container.

4. The method of manufacturing the container according to claim 3, further comprising:
injection molding the preform; and
heating the preform containing residual heat after the injection molding to adjust a temperature.

5. The method of manufacturing the container according to claim 4, wherein a neck portion side of a body portion of the preform is heated to a higher temperature than a bottom portion side while adjusting the temperature.

6. The method of manufacturing the container according to claim 4, further comprising:
sandwiching a container bottom surface portion between the stretching rod and the bottom mold surface after the structure is formed to form a thin film-shaped portion on the container bottom surface portion.

7. The method of manufacturing the container according to claim 6, wherein,
while adjusting the temperature, a gate portion formed at a bottom portion of the preform is sandwiched between and crushed by a first member accommodating the preform and a second member inserted into the preform.

8. A method of manufacturing a container using the container mold according to claim 2, the method comprising:
disposing a preform having a bottomed shape in the mold space of the split mold, the preform is made of resin and heated;
stretching the preform with a stretching rod;
introducing a pressurized fluid into the preform and blow-molding a container to expand to the bottom mold reception portion; and
closing the bottom mold and compressing a portion of the expanded container with the bottom mold reception portion and the bottom mold surface to form the structure on the container.

9. The method of manufacturing the container according to claim 8, further comprising:
injection molding the preform; and
heating the preform containing residual heat after the injection molding to adjust a temperature.

10. The method of manufacturing the container according to claim 9, wherein
a neck portion side of a body portion of the preform is heated to a higher temperature than a bottom portion side while adjusting the temperature.

11. The method of manufacturing the container according to claim 9, further comprising:
sandwiching a container bottom surface portion between the stretching rod and the bottom mold surface after the structure is formed to form a thin film-shaped portion on the container bottom surface portion.

12. The method of manufacturing the container according to claim 11, wherein,
while adjusting the temperature, a gate portion formed at a bottom portion of the preform is sandwiched between and crushed by a first member accommodating the preform and a second member inserted into the preform.

* * * * *